(12) United States Patent
Maeda et al.

(10) Patent No.: US 8,110,635 B2
(45) Date of Patent: Feb. 7, 2012

(54) METHOD FOR PRODUCING CONJUGATED DIENE POLYMER, CONJUGATED DIENE POLYMER, AND POLYMER COMPOSITION

(75) Inventors: Naoaki Maeda, Chiba (JP); Mayumi Oshima, Chiba (JP); Katsunari Inagaki, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 765 days.

(21) Appl. No.: 12/140,304

(22) Filed: Jun. 17, 2008

(65) Prior Publication Data

US 2009/0005497 A1    Jan. 1, 2009

(30) Foreign Application Priority Data

Jun. 27, 2007    (JP) .................................. 2007-168692

(51) Int. Cl.
C08C 19/22    (2006.01)

(52) U.S. Cl. .................. 525/375; 525/331.9; 525/333.1; 525/333.2; 525/283; 525/342

(58) Field of Classification Search ............... 525/331.9, 525/333.1, 333.2, 283, 375, 342
See application file for complete search history.

(56) References Cited

U.S. PATENT DOCUMENTS

| 4,645,844 | A | * | 2/1987 | Berger et al. | ................. | 548/545 |
| 4,647,625 | A | * | 3/1987 | Aonuma et al. | .............. | 525/232 |
| 5,001,196 | A | * | 3/1991 | Kawanaka et al. | ............ | 525/281 |
| 2009/0005515 | A1 | * | 1/2009 | Maeda et al. | .............. | 525/331.9 |

FOREIGN PATENT DOCUMENTS

| JP | 62-043402 | * | 2/1987 |
| JP | 62-043402 | A | | 2/1987 |
| JP | 1-217047 | A | | 8/1989 |
| JP | 2005-290355 | A | | 10/2005 |

* cited by examiner

Primary Examiner — Ling-Siu Choi
(74) Attorney, Agent, or Firm — Sughrue Mion, PLLC

(57) ABSTRACT

A method for producing a conjugated diene polymer is provided that includes a step of polymerizing a conjugated diene-containing monomer in a hydrocarbon solvent in the presence of an alkali metal catalyst, thus giving a polymer having a catalyst-derived alkali metal at one terminus of a polymer chain comprising a conjugated diene-based monomer unit, and a step of reacting the polymer obtained in the step of polymerizing and a trialkoxysilane compound represented by the formula below.

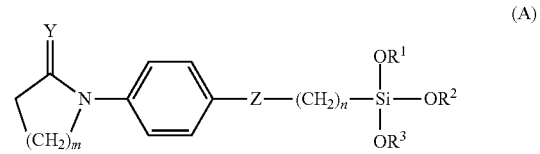

(A)

(In the formula, Y and Z independently denote an oxygen atom or a sulfur atom, $R^1$, $R^2$, and $R^3$ independently denote an alkyl group having 1 to 4 carbon atoms, m denotes an integer of 1 to 5, and n denotes an integer of 0 to 5.) There are also provided a conjugated diene polymer produced by the production method, and a polymer composition containing a rubber component that includes the conjugated diene polymer and carbon black and/or silica, the total content of the carbon black and the silica being 5 to 200 parts by weight relative to 100 parts by weight of the rubber component.

14 Claims, No Drawings

METHOD FOR PRODUCING CONJUGATED DIENE POLYMER, CONJUGATED DIENE POLYMER, AND POLYMER COMPOSITION

BACKGROUND OF THE INVENTION

1. Field of the Invention

The present invention relates to a method for producing a conjugated diene polymer, a conjugated diene polymer, and a polymer composition.

2. Description of the Related Art

In recent years, the demand for fuel saving for automobiles has been increasing; with regard to tires there is a desire for lowering the rolling resistance, thus achieving fuel saving. As a method for lowering the rolling resistance of tires from the materials viewpoint, the use of a material having a high rebound resilience as a tire material is a technique that is generally practiced.

As a specific tire material, a polymer composition comprising a conjugated diene polymer such as polybutadiene or a butadiene-styrene copolymer as a rubber component and carbon black or silica as a reinforcing agent is conventionally used, and in order to enhance the rebound resilience of this polymer composition, a variety of investigations have been carried out into the conjugated diene polymer used as the rubber component.

For example, JP-A-1-217047 proposes a conjugated diene polymer in which butadiene-styrene copolymerization is modified by an acrylamide compound having a dialkylamino group bonded to the nitrogen atom of the acrylamide via an alkylene group. Furthermore, JP-A-2005-290355 proposes a conjugated diene polymer in which butadiene-styrene copolymerization is modified by a trialkoxysilane compound having a dialkylamino group and a trialkoxysilyl group bonded via an alkylene group.

BRIEF SUMMARY OF THE INVENTION

However, the rebound resilience of a polymer composition using the acrylamide compound as a rubber component is not always satisfactory when it is mixed with silica as a reinforcing agent. Furthermore, the rebound resilience of a polymer composition using the trialkoxysilane compound as a rubber component is good when it is mixed with silica as a reinforcing agent, but is not always satisfactory when it is mixed with carbon black as a reinforcing agent.

In the light of such circumstances, it is an object of the present invention to provide a method for producing a modified diene polymer that can give a polymer composition having high rebound resilience even when it is mixed with carbon black as a reinforcing agent and even when it is mixed with silica as a reinforcing agent, a modified diene polymer produced by the production method, and a polymer composition comprising the modified diene polymer.

The above-mentioned object of the present invention has been attained by means described in (1), (15) and (16) below. These are described below together with (2) to (14), which are preferred embodiments.

(1) A method for producing a conjugated diene polymer, the method comprising step 1 and step 2 below:

step 1: a step of polymerizing a conjugated diene-containing monomer in a hydrocarbon solvent in the presence of an alkali metal catalyst, thus giving a polymer having a catalyst-derived alkali metal at one terminus of a polymer chain comprising a conjugated diene-based monomer unit; and step 2: a step of reacting the polymer obtained in step 1 and a trialkoxysilane compound represented by Formula (A) below,

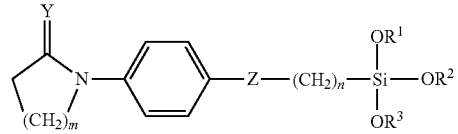

wherein Y and Z independently denote an oxygen atom or a sulfur atom, $R^1$, $R^2$, and $R^3$ independently denote an alkyl group having 1 to 4 carbon atoms, m denotes an integer of 1 to 5, and n denotes an integer of 0 to 5.

(2) The method according to (1), wherein Y in Formula (A) is an oxygen atom.

(3) The method according to (1) or (2), wherein Z in Formula (A) is an oxygen atom.

(4) The method according to any one of (1) to (3), wherein $R^1$, $R^2$, and $R^3$ in Formula (A) independently denote a methyl group or an ethyl group.

(5) The method according to any one of (1) to (4), wherein the compound represented by Formula (A) is at least one compound selected from the group consisting of 3-[4-(2-oxo-1-pyrrolidinyl)phenoxy]propyltrimethoxysilane, 3-[4-(2-oxo-1-pyrrolidinyl)phenoxy]propyltriethoxysilane, 3-[4-(2-oxo-1-pyrrolidinyl)phenoxy]butyltrimethoxysilane, 3-[4-(2-oxo-1-pyrrolidinyl)phenoxy]butyltriethoxysilane, 3-[4-(2-oxo-1-piperidinyl)phenoxy]propyltrimethoxysilane, 3-[4-(2-oxo-1-piperidinyl)phenoxy]propyltriethoxysilane, 3-[4-(2-oxo-1-piperidinyl)phenoxy]butyltrimethoxysilane, 3-[4-(2-oxo-1-piperidinyl)phenoxy]butyltriethoxysilane, 3-[4-(2-oxo-1-azacycloheptyl)phenoxy]propyltrimethoxysilane, 3-[4-(2-oxo-1-azacycloheptyl)phenoxy]propyltriethoxysilane, 3-[4-(2-oxo-1-azacycloheptyl)phenoxy]butyltrimethoxysilane, 3-[4-(2-oxo-1-azacycloheptyl)phenoxy]butyltriethoxysilane, and corresponding thiocarbonyl compounds and thioether compounds.

(6) The method according to any one of (1) to (5), wherein the compound represented by Formula (A) is 3-[4-(2-oxo-1-pyrrolidinyl)phenoxy]propyltrimethoxysilane.

(7) The method according to any one of (1) to (6), wherein the amount of compound represented by Formula (A) used is 0.06 to 10 moles per mole of alkali metal of the alkali metal catalyst.

(8) The method according to any one of (1) to (7), wherein the alkali metal catalyst is an organoalkali metal compound.

(9) The method according to (8), wherein the organoalkali metal compounds is an organolithium compound having 2 to 20 carbon atoms or an organosodium compound having 2 to 20 carbon atoms.

(10) The method according to any one of (1) to (9), wherein the conjugated diene-containing monomer is at least one monomer selected from the group consisting of 1,3-butadiene, isoprene, 1,3-pentadiene, 2,3-dimethyl-1,3-butadiene, and 1,3-hexadiene.

(11) The method according to any one of (1) to (10), wherein, when the content of the conjugated diene-based monomer unit is 100 mol %, the content of vinyl bonds derived from the conjugated diene-based monomer unit in the conjugated diene polymer is 10 to 70 mol %.

(12) The method according to any one of (1) to (11), wherein the conjugated diene polymer further comprises an aromatic vinyl compound-based monomer unit.

(13) The method according to (12), wherein the content of the aromatic vinyl compound-based monomer unit is 10 to 50 wt % relative to 100 wt % of the total amount the conjugated diene-based monomer unit and the aromatic vinyl compound-based monomer unit.
(14) The method according to any one of (1) to (13), wherein the polymerization temperature in step A is 0° C. to 150° C., and the polymerization time is 5 minutes to 10 hours.
(15) A conjugated diene polymer obtained by the method according to any one of (1) to (14).
(16) A polymer composition comprising a rubber component comprising the conjugated diene polymer according to (15); and carbon black and/or silica; the total content of the carbon black and the silica being 5 to 200 parts by weight relative to 100 parts by weight of the rubber component.

DETAILED DESCRIPTION OF THE INVENTION

The production method of the present invention is a method for producing a conjugated diene polymer, the method comprising step 1 and step 2 below.
Step 1: a step of polymerizing a conjugated diene-containing monomer in a hydrocarbon solvent in the presence of an alkali metal catalyst, thus giving a polymer having a catalyst-derived alkali metal at one terminus of a polymer chain comprising a conjugated diene-based monomer unit.
Step 2: a step of reacting the polymer obtained in step 1 and a trialkoxysilane compound represented by Formula (A) below.

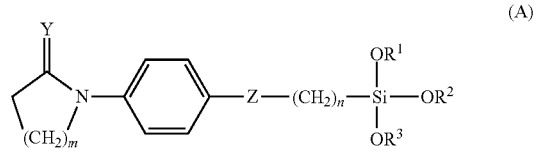

(In the formula, Y and Z independently denote an oxygen atom or a sulfur atom, $R^1$, $R^2$, and $R^3$ independently denote an alkyl group having 1 to 4 carbon atoms, m denotes an integer of 1 to 5, and n denotes an integer of 0 to 5.)

Examples of the alkali metal catalyst used in step 1 include an alkali metal, an organoalkali metal compound, a complex between an alkali metal and a polar compound, and an oligomer having an alkali metal. Among them, an organoalkali metal compound is preferable.

Examples of the alkali metal include lithium, sodium, potassium, rubidium, and cesium. Examples of the organoalkali metal compound include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. Examples of the complex between an alkali metal and a polar compound include a potassium-tetrahydrofuran complex and a potassium-diethoxyethane complex, and examples of the oligomer having an alkali metal include the sodium salt of α-methylstyrene tetramer. Among them, an organolithium compound or organosodium compound is preferable, and an organolithium compound or organosodium compound having 2 to 20 carbon atoms is more preferable, and n-butyllithium is yet more preferable.

Examples of the conjugated diene in step 1 include 1,3-butadiene, isoprene, 1,3-pentadiene, 2,3-dimethyl-1,3-butadiene, and 1,3-hexadiene, and they may be used on their own or in a combination of two or more types. From the viewpoint of ready availability, 1,3-butadiene and isoprene are preferable.

In step 1, copolymerization of the conjugated diene with another monomer may be carried out. Examples of said other monomer include an aromatic vinyl compound, a vinylnitrile, and an unsaturated carboxylic acid ester. Specific examples of the aromatic vinyl compound include styrene, α-methylstyrene, vinyltoluene, vinylnaphthalene, divinylbenzene, trivinylbenzene, and divinylnaphthalene. Specific examples of the vinylnitrile include acrylonitrile, and specific examples of the unsaturated carboxylic acid ester include methyl acrylate, ethyl acrylate, methyl methacrylate, and ethyl methacrylate. Among them, an aromatic vinyl compound is preferable, and from the viewpoint of ready availability styrene is preferable.

The hydrocarbon solvent used in step 1 is a solvent that does not deactivate the alkali metal catalyst, and examples thereof include an aliphatic hydrocarbon, an aromatic hydrocarbon, and an alicyclic hydrocarbon. Specific examples of the aliphatic hydrocarbon include propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. Specific examples of the aromatic hydrocarbon include benzene, toluene, xylene, and ethylbenzene, and specific examples of the alicyclic hydrocarbon include cyclopentane and cyclohexane. They may be used on their own or in a combination of two or more types. Among them, a hydrocarbon having 3 to 12 carbon atoms is preferable.

Step 1 may be carried out in the presence of an agent for adjusting the amount of vinyl bonds of the conjugated diene unit, or an agent for adjusting the distribution in the conjugated diene polymer chain of the conjugated diene unit and a monomer unit based on a monomer other than the conjugated diene. Examples of such agents include an ether compound and a tertiary amine. Specific examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Specific examples of the tertiary amine include triethylamine, tripropylamine, tributylamine, N,N,N',N'-tetramethylethylenediamine, N,N-diethylaniline, pyridine, and quinoline. They may be used on their own or in a combination of two or more types.

The polymerization temperature in step 1 is normally 0° C. to 150° C., and preferably room temperature (about 25° C.) to 100° C. The polymerization time is normally 5 minutes to 10 hours, and preferably 30 minutes to 6 hours.

In this specification, a range of values with the description 'normally' means the widest range of preferred values and, needless to say, there is nothing to prevent an embodiment in a range other than that.

The trialkoxysilane compound used in step 2 is a compound represented by Formula (A) below.

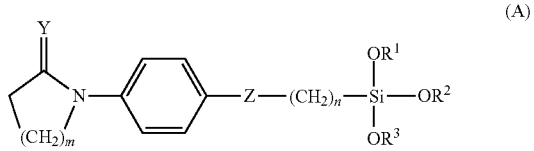

(In the formula, Y and Z independently denote an oxygen atom or a sulfur atom, $R^1$, $R^2$, and $R^3$ independently denote an alkyl group having 1 to 4 carbon atoms, m denotes an integer of 1 to 5, and n denotes an integer of 0 to 5.)

In Formula (A), Y denotes an oxygen atom or a sulfur atom, and preferably an oxygen atom. Furthermore, Z denotes an oxygen atom or a sulfur atom, and preferably an oxygen atom.

In Formula (A), $R^1$, $R^2$, and $R^3$ independently denote an alkyl group having 1 to 4 carbon atoms. Examples of the alkyl group include a methyl group, an ethyl group, an n-propyl group, an isopropyl group, an n-butyl group, a sec-butyl group, and a tert-butyl group. It is preferably a methyl group or an ethyl group.

In Formula (A), m denotes an integer of 1 to 5, and preferably 2 to 4. Furthermore, n denotes an integer of 0 to 5, and preferably 3 or 4.

Examples of the compound represented by Formula (A) include 3-[4-(2-oxo-1-pyrrolidinyl)phenoxy]propyltrimethoxysilane, 3-[4-(2-oxo-1-pyrrolidinyl)phenoxy]propyltriethoxysilane, 3-[4-(2-oxo-1-pyrrolidinyl)phenoxy]butyltrimethoxysilane, 3-[4-(2-oxo-1-pyrrolidinyl)phenoxy]butyltriethoxysilane, 3-[4-(2-oxo-1-piperidinyl)phenoxy]propyltrimethoxysilane, 3-[4-(2-oxo-1-piperidinyl)phenoxy]propyltriethoxysilane, 3-[4-(2-oxo-1-piperidinyl)phenoxy]butyltrimethoxysilane, 3-[4-(2-oxo-1-piperidinyl)phenoxy]butyltriethoxysilane, 3-[4-(2-oxo-1-azacycloheptyl)phenoxy]propyltrimethoxysilane, 3-[4-(2-oxo-1-azacycloheptyl)phenoxy]propyltriethoxysilane, 3-[4-(2-oxo-1-azacycloheptyl)phenoxy]butyltrimethoxysilane, 3-[4-(2-oxo-1-azacycloheptyl)phenoxy]butyltriethoxysilane, and corresponding thiocarbonyl compounds and thioether compounds. 3-[4-(2-oxo-1-pyrrolidinyl)phenoxy]propyltrimethoxysilane is preferable.

The amount of compound represented by Formula (A) used in step 2 is normally 0.06 to 10 moles per mole of alkali metal of the alkali metal catalyst used in step 1. From the viewpoint of rebound resilience being enhanced, the amount thereof used is preferably at least 0.1 moles, and more preferably at least 0.2 moles. Furthermore, from the viewpoint of cost effectiveness the amount thereof used is preferably no greater than 5 moles, and more preferably no greater than 2 moles.

The reaction of step 2 is normally carried out in a hydrocarbon solvent, and examples of the hydrocarbon solvent include compounds cited as examples of the hydrocarbon solvent used in step 1. The compound represented by Formula (A) may be added to a reaction solution after completion of step 1.

The reaction temperature of step 2 is normally −80° C. to 150° C., and preferably 0° C. to 100° C. The reaction time is normally 1 minute to 5 hours, and preferably 5 minutes to 3 hours.

After completion of step 2, a compound having an active hydrogen such as water or an alcohol is added to a reaction solution, and the conjugated diene polymer may be recovered from the reaction solution by a conventional recovery method such as, for example, (1) a method in which a coagulant is added to the reaction solution of the conjugated diene polymer or (2) a method in which steam is added to the reaction solution of the conjugated diene polymer. The conjugated diene polymer thus recovered may be dried by a conventional dryer such as a band dryer or an extrusion dryer.

The Mooney viscosity ($ML_{1+4}$ 100° C.) of the conjugated diene polymer is preferably 10 to 200. The Mooney viscosity is preferably at least 20 from the viewpoint of enhancing the tensile strength. Furthermore, from the viewpoint of processability and tensile strength being enhanced, it is preferably no greater than 150. The Mooney viscosity is measured in accordance with JIS K6300 (1994) at 100° C.

From the viewpoint of rebound resilience being enhanced, the content of vinyl bonds derived from the conjugated diene-based monomer unit (hereinafter, called conjugated diene unit) in the conjugated diene polymer is preferably no greater than 70 mole % when the content of the conjugated diene unit is 100 mole %, and more preferably no greater than 60 mole %. Furthermore, from the viewpoint of flexibility and tire grip performance being enhanced, it is preferably at least 10 mole %, and more preferably at least 15 mole %. The content of vinyl bonds may be obtained by IR spectroscopy from absorption intensity at around 910 $cm^{-1}$, which is the absorption peak of a vinyl group.

The conjugated diene polymer preferably comprises an aromatic vinyl-based monomer unit (aromatic vinyl unit) from the viewpoint of tensile strength being enhanced, and the content of the aromatic vinyl unit, relative to 100 wt % of the total amount of the conjugated diene unit and the aromatic vinyl unit, is preferably at least 10 wt % (the content of the conjugated diene unit being no greater than 90 wt %), and more preferably at least 15 wt % (the content of the conjugated diene unit being no greater than 85 wt %). Furthermore, from the viewpoint of rebound resilience being enhanced, the content of the aromatic vinyl unit is preferably no greater than 50 wt % (the content of the conjugated diene unit being at least 50 wt %), and more preferably no greater than 45 wt % (the content of the conjugated diene unit being at least 55 wt %).

The conjugated diene polymer may be used in a polymer composition by mixing another rubber component, an additive, etc. therewith.

Examples of said other rubber component include a conventional styrene-butadiene copolymer, polybutadiene, a butadiene-isoprene copolymer, and butyl rubber. Examples further include natural rubber, an ethylene-propylene copolymer, and an ethylene-octene copolymer. These rubber components may be used in a combination of two or more types.

From the viewpoint of rebound resilience being further enhanced, the content of the conjugated diene polymer of the present invention is preferably at least 10 wt % relative to 100 wt % of the total amount of rubber components, more preferably at least 20 wt %, and yet more preferably at least 50 wt %.

As the additive, a conventional additive may be used, and examples thereof include a vulcanizing agent such as sulfur; a vulcanization accelerator such as a thiazole-based vulcanization accelerator, a thiuram-based vulcanization accelerator, or a sulfenamide-based vulcanization accelerator; a vulcanization activator such as stearic acid or zinc oxide; an organic peroxide; a reinforcing agent such as carbon black or silica; a filler such as calcium carbonate or talc; a silane coupling agent; an extender oil; a processing aid; an antioxidant; and a lubricant.

When the conjugated diene polymer is mixed with carbon black and/or silica, the total content of the carbon black and the silica in the polymer composition is normally 5 to 200 parts by weight relative to 100 parts by weight of the rubber component. From the viewpoint of tensile strength being enhanced, the content is preferably at least 10 parts by weight, and more preferably at least 30 parts by weight. Furthermore, from the viewpoint of flexibility and rebound resilience being enhanced, it is preferably no greater than 150 parts by weight, and more preferably no greater than 100 parts by weight.

When the conjugated diene polymer is mixed with a vulcanizing agent, the content of the vulcanizing agent in the polymer composition is normally 0.1 to 10 parts by weight relative to 100 parts by weight of the rubber component. From the viewpoint of tensile strength being enhanced, the content is preferably at least 0.3 parts by weight, and more preferably at least 0.5 parts by weight. Furthermore, from the viewpoint of rebound resilience being enhanced, it is preferably no greater than 8 parts by weight, and more preferably no greater than 5 parts by weight.

As a method for producing a polymer composition by mixing another rubber component, an additive, etc. with the conjugated diene polymer, a conventional method such as, for example, a method in which each component is kneaded by means of a conventional mixer such as a roll mixer or a Banbury mixer can be used.

With regard to kneading conditions, when the conjugated diene polymer is mixed with an additive other than a vulcanizing agent, the kneading temperature is normally 50° C. to 200° C., and preferably 80° C. to 190° C., and the kneading time is normally 30 sec to 30 min, and preferably 1 min to 30 min. When the conjugated diene polymer is mixed with a vulcanizing agent, the kneading temperature is normally no greater than 100° C., and preferably room temperature to 80° C. A composition in which a vulcanizing agent is mixed may be used by carrying out a vulcanization treatment such as press vulcanization. The vulcanization temperature is normally 120° C. to 200° C., and preferably 140° C. to 180° C.

The polymer composition comprising the conjugated diene polymer of the present invention, and a vulcanized product of the polymer composition have excellent rebound resilience. Because of this, the conjugated diene polymer of the present invention, the polymer composition comprising the conjugated diene polymer, and the vulcanized product of the polymer composition are suitably used for tires, soles, flooring materials, vibration isolating rubber, etc.

In accordance with the present invention, it is possible to provide a method for producing a modified diene polymer that can give a polymer composition having high rebound resilience even when it is mixed with carbon black as a reinforcing agent and even when it is mixed with silica as a reinforcing agent, a modified diene polymer produced by the production method, and a polymer composition comprising the modified diene polymer.

EXAMPLES

The present invention is specifically explained below by reference to Examples.

Physical properties of polymers were measured by the following methods.

1. Mooney Viscosity ($ML_{1+4}$ 100° C.)

Measured at 100° C. in accordance with JIS K6300 (1994).

2. Vinyl Content

Determined by IR spectroscopy from absorption intensity at around 910 $cm^{-1}$, which is the absorption peak of a vinyl group.

3. Styrene Unit Content

Determined from refractive index in accordance with JIS K6383 (1995).

4. Rebound Resilience

Measured in accordance with JIS K6255 using a Lupke type rebound resilience tester at 60° C.

Example 1

Production of Conjugated Diene Polymer

A 20 L capacity stainless steel polymerization reactor was washed, dried, and flushed with dry nitrogen. Subsequently, it was charged with 10.2 kg of hexane, 1560 g of 1,3-butadiene, 440 g of styrene, 328 g of tetrahydrofuran, and 16.0 mmol of n-butyllithium, and polymerization was carried out at 65° C. for 3 hours while stirring. After completion of polymerization, 5.43 g of 3-[4-(2-oxo-1-pyrrolidinyl)phenoxy]propyltrimethoxysilane was added thereto. After stirring for 15 minutes, 10 mL of methanol was added thereto and stirring was carried out for a further 5 minutes. Subsequently, the contents of the polymerization reactor were taken out, 10 g of 2,6-di-t-butyl-p-cresol (product name: Sumilizer BHT, manufactured by Sumitomo Chemical Co., Ltd.) was added thereto, the majority of the hexane was evaporated, and drying was carried out at 55° C. for 12 hours under vacuum, thus giving a polymer. The results of measurement of the physical properties of the polymer are given in Table 1.

Preparation of Polymer Composition A 100 parts by weight of the polymer thus obtained, 50 parts by weight of carbon black (product name: N-339, manufactured by Mitsubishi Chemical Corp.), 10 parts by weight of an extender oil (product name: X-140, manufactured by Kyodo Sekiyu), 1 part by weight of an antioxidant (product name: Antigene 3C, manufactured by Sumitomo Chemical Co., Ltd.), 4 parts by weight of zinc oxide, 2 parts by weight of stearic acid, 1 part by weight of a vulcanization accelerator (product name Soxinol CZ, manufactured by Sumitomo Chemical Co., Ltd.), 1.5 parts by weight of a wax (product name: Sunnoc N, manufactured by Ouchi Shinko Chemical Industrial Co., Ltd.), and 1.75 parts by weight of sulfur were kneaded by means of a Labo Plastomill, and the polymer composition thus obtained was molded into a sheet using a 6 inch roll. Subsequently, the sheet-form polymer composition was vulcanized by heating at 160° C. for 15 minutes, and the rebound resilience of the vulcanized sheet was evaluated. The evaluation result is given in Table 1.

Preparation of Polymer Composition B 100 parts by weight of the polymer thus obtained, 78.4 parts by weight of silica (product name: Ultrasil VN3-G, manufactured by Degussa, Inc.), 6.4 parts by weight of carbon black (product name: N-339, manufactured by Mitsubishi Chemical Corp.), 6.4 parts by weight of a silane coupling agent (product name: Si69, manufactured by Degussa, Inc.), 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of zinc oxide, 2 parts by weight of stearic acid, 1 part by weight of a vulcanization accelerator (product name: Soxinol CZ, manufactured by Sumitomo Chemical Co., Ltd.), 1 part by weight of a vulcanization accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill, and the polymer composition thus obtained was molded into a sheet using a 6 inch roll. Subsequently, the sheet-form polymer composition was vulcanized by heating at 160° C.

for 45 minutes, and the rebound resilience of the vulcanized sheet was evaluated. The evaluation result is given in Table 1.

Comparative Example 1

The procedure of Example 1 was repeated except that the amount of n-butyllithium added was changed to 8.5 mmol, and 0.16 mmol of silicon tetrachloride and 1.26 g of N,N-dimethylaminopropylacrylamide were added instead of the 3-[4-(2-oxo-1-pyrrolidinyl)phenoxy]propyltrimethoxysilane. The results of measurement of the physical properties of the polymer thus obtained and a vulcanized sheet are shown in Table 1.

TABLE 1

|  | Ex. 1 | Comp. Ex. 1 |
|---|---|---|
| Conjugated diene polymer |  |  |
| $ML_{1+4}$ 100° C. | 44 | 70 |
| Styrene content wt % | 23 | 22 |
| Vinyl content % | 59 | 57 |
| Rebound resilience 60° C. |  |  |
| Polymer composition A | 64 | 57 |
| Polymer composition B | 59 | 54 |

The invention claimed is:

1. A method for producing a conjugated diene polymer, the method comprising step 1 and step 2 below:
   step 1: a step of polymerizing a conjugated diene-containing monomer in a hydrocarbon solvent in the presence of an alkali metal catalyst, thus giving a polymer having a catalyst-derived alkali metal at one terminus of a polymer chain comprising a conjugated diene-based monomer unit; and
   step 2: a step of reacting the polymer obtained in step 1 and a trialkoxysilane compound represented by Formula (A) below.

$$\text{(A)}$$

wherein Y and Z independently denote an oxygen atom or a sulfur atom, $R^1$, $R^2$, and $R^3$ independently denote an alkyl group having 1 to 4 carbon atoms, m denotes an integer of 1 to 5, and n denotes an integer of 0 to 5.

2. The method according to claim 1, wherein Y in Formula (A) is an oxygen atom.

3. The method according to claim 1, wherein Z in Formula (A) is an oxygen atom.

4. The method according to claim 1, wherein $R^1$, $R^2$, and $R^3$ in Formula (A) independently denote a methyl group or an ethyl group.

5. The method according to claim 1, wherein the compound represented by Formula (A) is at least one compound selected from the group consisting of 3-[4-(2-oxo-1-pyrrolidinyl)phenoxy]propyltrimethoxysilane, 3-[4-(2-oxo-1-pyrrolidinyl)phenoxy]propyltriethoxysilane, 3-[4-(2-oxo-1-pyrrolidinyl)phenoxy]butyltrimethoxysilane, 3-[4-(2-oxo-1-pyrrolidinyl)phenoxy]butyltriethoxysilane, 3-[4-(2-oxo-1-piperidinyl)phenoxy]propyltrimethoxysilane, 3-[4-(2-oxo-1-piperidinyl)phenoxy]propyltriethoxysilane, 3-[4-(2-oxo-1-piperidinyl)phenoxy]butyltrimethoxysilane, 3-[4-(2-oxo-1-piperidinyl)phenoxy]butyltriethoxysilane, 3-[4-(2-oxo-1-azacycloheptyl)phenoxy]propyltrimethoxysilane, 3-[4-(2-oxo-1-azacycloheptyl)phenoxy]propyltriethoxysilane, 3-[4-(2-oxo-1-azacycloheptyl)phenoxy]butyltrimethoxysilane, 3-[4-(2-oxo-1-azacycloheptyl)phenoxy]butyltriethoxysilane, and corresponding thiocarbonyl compounds and thioether compounds.

6. The method according to claim 1, wherein the compound represented by Formula (A) is 3-[4-(2-oxo-1-pyrrolidinyl)phenoxy]propyltrimethoxysilane.

7. The method according to claim 1, wherein the amount of compound represented by Formula (A) used is 0.06 to 10 moles per mole of alkali metal of the alkali metal catalyst.

8. The method according to claim 1, wherein the alkali metal catalyst is an organoalkali metal compound.

9. The method according to claim 8, wherein the organoalkali metal compounds is an organolithium compound having 2 to 20 carbon atoms or an organosodium compound having 2 to 20 carbon atoms.

10. The method according to claim 1, wherein the conjugated diene-containing monomer is at least one monomer selected from the group consisting of 1,3-butadiene, isoprene, 1,3-pentadiene, 2,3-dimethyl-1,3-butadiene, and 1,3-hexadiene.

11. The method according to claim 1, wherein, when the content of the conjugated diene-based monomer unit is 100 mol %, the content of vinyl bonds derived from the conjugated diene-based monomer unit in the conjugated diene polymer is 10 to 70 mol %.

12. The method according to claim 1, wherein the conjugated diene polymer further comprises an aromatic vinyl compound-based monomer unit.

13. The method according to claim 12, wherein the content of the aromatic vinyl compound-based monomer unit is 10 to 50 wt % relative to 100 wt % of the total amount the conjugated diene-based monomer unit and the aromatic vinyl compound-based monomer unit.

14. The method according to claim 1, wherein the polymerization temperature in step A is 0° C. to 150° C., and the polymerization time is 5 minutes to 10 hours.

* * * * *